United States Patent Office 2,784,178
Patented Mar. 5, 1957

2,784,178
AZO-DYESTUFFS

Christian Zickendraht, Binningen, and Arthur Buehler, Rheinfelden, Switzerland, assignors to Ciba Limited, Basel, Switzerland, a Swiss firm No Drawing. Application May 3, 1954,
Serial No. 427,361

Claims priority, application Switzerland May 5, 1953

11 Claims. (Cl. 260—147)

The present invention is based on the observation that valuable new metalliferous azo-dyestuffs are obtained by treating a monoazo-dyestuff which contains an armoatically bound —$SO_2NH_2$ group and is free from sulfonic acid and carboxylic acid groups, and corresponds to the general formula (1)

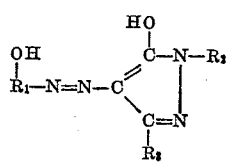

in which $R_1$ represents a benzene radical bound to the azo-linkage in ortho-position relatively to the hydroxyl group,
$R_2$ represents a hydrogen atom, or an alkyl or benzene radical, and
$R_3$ represents an aryl radical, and in which at least one of the aromatic radicals in the dyestuff molecule contains a substituent not imparting solubility in water, with an agent yielding cobalt or chromium under conditions such that a metalliferous azo dyestuff is obtained which contains less than one atom of cobalt or chromium in complex union per molecule of monoazodyestuff.

The monoazo-dyestuffs of the above general formula (1) serving as starting materials in the present process can be obtained by coupling an ortho-hydroxy-diazocompound of the benzene series which is free from sulfonic acid and carboxylic acid groups with a 3-aryl-5-pyrazolone, and so selecting the starting materials that the resulting monoazo-dyestuff contains, in addition to a —$SO_2NH_2$ group, at least one aromatically bound substituent not imparting solubility in water, advantageously a nitro, alkoxy or alkyl group or a halogen atom.

As ortho-hydroxy-diazo-compounds of the benzene series there come into consideration for the preparation of the dyestuffs serving as starting materials in the present process, on the one hand, compounds which are free from sulfonic acid amide groups, such as the diazo compounds of 4-chloro-, 4- or 5-nitro-, 4:6-dichloro-2-amino-1-hydroxybenzene or 4-nitro-6-chloro-2-amino-1-hydroxybenzene, which are to be coupled with 3-aryl-5-pyrazolones, containing a —$SO_2NH_2$ group, such as 1:3-diphenyl-5-pyrazolone-2'-, 3'- or 4'- sulfonic acid amide. Advantageously, there are used ortho-hydroxy-diazo-compounds of the benzene series which contain a —$SO_2NH_2$ group, especially the diazo-compounds of the following ortho-hydroxy-amines:

(a) 6 - chloro - 2 - amino-1-hydroxybenzene-4-sulfonic acid amide, 6-nitro-2-amino-1-hydroxybenzene-4-sulfonic acid amide, 4-chloro-2-amino-1-hydroxybenzene-5- or -6-sulfonic acid amide, 4-nitro-2-amino-1-hydroxybenzene-5- or -6-sulfonic acid amide, 4-methyl-2-amino-1-hydroxybenzene-5- or -6-sulfonic acid amide, 4-methoxy-2-amino-1-hydroxybenzene-5- or -6-sulfonic acid amide,and especially (b) 2-amino-1-hydroxybenzene-4- or -5-sulfonic acid amide.

The two latter components are to be coupled exclusively with 3-aryl-5-pyrazolones, which contain an aromatically bound nitro, alkoxy or alkyl group or a halogen atom.

For coupling with these diazo compounds containing a —$SO_2NH_2$ group there are used on the one hand, 3-aryl-5-pyrazolones which contain an aromatically bound substituent not imparting solubility in water, for example, 3-(3'- or 4'-methyl-phenyl)-5-pyrazolone, 3-(4'-tertiary-butylphenyl)-5-pyrazolone,-3-(2'-,3'- or 4'-chlorophenyl)-5-pyrazolone, 3-(4'-fluorophenyl)-5-pyrazolone, 3-(4'-trifluoromethyl - phenyl) - 5 - pyrazolone, 3 - (4'-ethoxyphenyl)-5-pyrazolone, 3-(2':5'-dichlorophenyl)-5-pyrazolone, 1 - (2'-methyl-5'-chlorophenyl)-3-phenyl-5-pyrazolone, 1-(2'-, 3'- or 4'-chlorophenyl)-3-phenyl-5-pyrazolone, 1-(3'-nitrophenyl)-3-phenyl-5-pyrazolone, 1-phenyl-3-(3'-chlorophenyl)-5-pyrazolone, 1-(3'-ethoxyphenyl)-3-methyl - 5 - pyrazolone or 1-(4'-chlorophenyl)-3-(2'-chlorophenyl)-5-pyrazolone.

On the other hand, there may also be used as coupling compononets 3-phenyl-5-pyrazolone and 1:3-diphenyl-5-pyrazolone. However, these two coupling components are to be coupled only with the diazo-components mentioned under (a), especially with diazotized 4-chloro-2-amino-1-hydroxybenzene-5- or -6-sulfonic acid amide.

The coupling of the ortho-hydroxy-diazo-compounds with the pyrazolones can be carried out by the usual methods, for example, in a weakly acid to alkaline medium.

After the coupling reaction, the dyestuffs, for the purpose of metallization, can easily be separated from the coupling mixture by filtration, if desired after the addition of sodium chloride, because they are only sparingly soluble in water. They are advantageously used for metallization in the form of filter cakes without intermediate drying. In some cases, however it is possible to carry out the metallization directly in the coupling mixture, that is to say, without any intermediate separation.

The monoazo-dyestuffs serving as starting materials in the present process, and obtainable as described above, are new and in general they dissolve so well in water in the form of their alkali compounds that they can be used for dyeing from baths which need no addition of acid, for example, by the single bath chroming process.

The treatment with the agent yielding cobalt or chromium in the present process is carried out under conditions such that a metalliferous azo dyestuff is obtained which contains less than one atom of cobalt or chromium in complex union per molecule of monoazo-dyestuffs. Accordingly, the metallization is advantageously carried out with such agents yielding cobalt or chromium and by such methods as are known to lead to complex metal compounds of the foregoing constitution. For example it is generally recommended to use less than one, but at least ½, atomic proportion of cobalt or chromium per molecular proportion of dyestuff and/or to carry out the metallization in a weakly acid to alkaline medium. Consequently, those agents yielding cobalt or chromium are specially suitable for the present process which are stable in alkaline media, for example, complex cobalt or chromium compounds of aliphatic hydroxy-carboxylic acids or dicarboxylic acids or advantageously complex chromium compounds of aromatic ortho-hydroxy-carboxylic acids, which contain the chromium bound in complex union. As examples of aliphatic hydroxy-carboxylic acids or dicarboxylic acids there may be mentioned, inter alia, oxalic acid, lactic acid, glycollic acid, citric acid and especially tartaric acid, and among the aromatic ortho-hydroxy-carboxylic acids, there may be mentioned, for example, those of the benzene series, such as 4-, 5- or 6-methyl-1-hydroxybenzene-2-carboxylic acid and above all 1-hydroxybenzene-2-carboxylic acid itself. As agents yielding cobalt there are especially suitable, however, simple compounds of divalent cobalt such as cobalt sulfate or cobalt acetate, and if desired freshly precipitated cobalt hydroxide.

The conversion of the dyestuffs into the complex cobalt and chromium compounds is advantageously carried out at a raised temperature, under atmospheric or superatmospheric pressure, for example, at the boiling temperature of the reaction mixture, if desired in the presence of suitable additions, for example, in the presence of salts of organic acids, bases, organic solvents or other agents assisting the formation of complexes.

In one form of the process of the invention there is used as starting material a mixture of two different metallizable monoazo-dyestuffs both of which correspond to the above Formula 1 or one of which corresponds to that formula and the other is an ortho:ortho'-dihydroxy-monoazo-dyestuff free from sulfonic acid and carboxylic acid groups.

The ortho:ortho'-dihydroxy-monoazo-dyestuffs, which come into consideration for carrying out the form of the process described in the preceding paragraph, can be obtained by coupling an ortho-hydroxy-diazo compound of the benzene series which is free from sulfonic acid and carboxylic acid groups with an azo component capable of coupling in a position vicinal to a hydroxyl group, and which is free from sulfonic acid and carboxylic acid groups. As examples of ortho-hydroxy-diazo-compounds of the benzene series there may be mentioned those obtainable from the following amines:

4- or 5-nitro-2-amino-1-hydroxybenzene, 4- or 5-chloro-2-amino-1-hydroxybenzene, 6-acetylamino-4-nitro-2-amino-1-hydroxybenzene, 4-acetylamino-6-nitro-2-amino-1-hydroxybenzene, 2-amino-1-hydroxybenzene-4-methylsulfone, 2-amino-1-hydroxybenzene-4- or -5-sulfonic acid-N-methyl-, -N-ethyl-, -N-$\beta$-hydroxyethyl- or -phenyl-amide and the other ortho-hydroxy-amines mentioned above. As azo components there come into consideration $\alpha$-naphthols such, for example, as 5-chloro-1-hydroxynaphthalene-, 5:8-dichloro-1-hydroxynaphthalene and above all $\beta$-naphthols such, for example, as 2-hydroxynaphthalene, 6-bromo-2-hydroxynaphthalene, 6- or 7-methoxy-2-hydroxynaphthalene, 1-acetyl-, 1-butyryl- or 1-benzoyl-amino-7-hydroxynaphthalene, and also 1-carbomethoxy- or 1-carbethoxyamino-7-hydroxynaphthalene and pyrazolones such as 3-methyl-5-pyrazolone, 1-phenyl-3-methyl-5-pyrazolone or 1-phenyl-3-methyl-5-pyrazolone-3'-sulfonic acid amide.

In this form of the process the treatment with an agent yielding metal is, of course, also carried out under conditions such that metalliferous azo-dyestuffs are obtained which contain less than one atom of metal in complex union per molecule of monoazo-dyestuff.

The products of the process of this invention are new. They are cobalt or chromium compounds which contain two monoazo-dyestuffs, in a complex, in which the ratio of the number of cobalt or chromium atoms bound in complex union to the number of monoazo-dyestuff molecules bound in complex union to the cobalt or chromium is smaller than 1:1, and advantageously about 1:2, and in which the two monoazo-dyestuffs are ortho:ortho'-dihydroxy-monoazo-dyestuffs free from sulfonic acid and carboxylic acid groups, and one of which dyestuffs, or advantageously both dyestuffs, correspond to the above general Formula 1.

The new cobaltiferous and chromiferous dyestuffs are soluble in water and also in weakly acid aqueous media, and are indeed more soluble than the parent metal-free dyestuffs used for making them. They are suitable for dyeing or printing a very wide variety of materials, above all for dyeing animal materials such as silk, leather and especially wool, but also for dyeing or printing synthetic fibers of superpolyamides or superpolyurethanes or polyacrylonitrile. In contradistinction to the chromium compounds of dyestuffs containing sulfonic acid groups, which are advantageously used for dyeing from strong acid, for example, sulfuric acid, baths, the new metal compounds of monoazo-dyestuffs free from sulfonic acid groups are especially suitable for dyeing from weakly alkaline, neutral to weakly acid, advantageously acetic acid, baths. There may, of course, be added to the dyebath the assistants customary in the dyeing industry such as sodium sulfate, sodium pyrophosphate, ethylene oxide condensation products and the like. The dyeings so produced are distinguished by their level character, very good fastness to light and very good properties of wet fastness such as a very good fastness to washing and fulling. The dyeings are also very fast to decatizing and carbonizing.

The following examples illustrate the invention, the parts and percentages being by weight unless otherwise stated and the relationship of parts by weight to parts by volume being the same as that of the kilogram to the liter:

*Example 1*

18.8 parts of 2-amino-1-phenol-4-sulfonic acid amide are suspended in 50 parts of water, 14 parts of hydrochloric acid of 30 percent strength are added, and diazotization is carried out at 0–5° C. with an aqueous solution of 6.9 parts of sodium nitrite. The diazo-suspension is neutralized with sodium carbonate and added to a solution, cooled to 5° C., of 30 parts of 1-(2'-methyl-5'-chlorophenyl)-3-phenyl-5-pyrazolone in 125 parts of water, 55 parts by volume of a 2 N-solution of sodium hydroxide and 50 parts by volume of a 2 N-solution of sodium carbonate. When the coupling is finished the dyestuff is filtered off and washed with dilute sodium chloride solution.

The filter cake is suspended in 1500 parts of water, then mixed with 125 parts of a solution of sodium chromosalicylate having a chromium content of 2.6 percent, and the mixture is boiled for about 6 hours under reflux. The dyestuff is isolated by salting out, and filtration, and is then dried in vacuo. It is a brown orange powder which dissolves in hot water with an orange coloration and in concentrated sulfuric acid with a yellow coloration. The dyestuff dyes wool from weakly alkaline, neutral or acetic acid baths red-orange tints which are very fast to light.

By dissolving the metal-free dyestuff obtained as described above in 1000 parts of water and 26 parts of a sodium hydroxide solution of 30 percent strength, then adding 300 parts of a cobalt sulfate solution having a cobalt content of 1 percent, and heating the mixture for a short time at about 70° C., the cobalt compound of the dyestuff is obtained. When dry it is a yellow-brown powder which dyes wool from neutral or weakly acetic acid baths brownish orange-yellow tints which are very fast to light.

Similar dyestuffs are obtained by treating the monoazo-dyestuffs obtainable from the diazo- and coupling components mentioned in columns I and II of the following table in the manner described above with an agent yielding the metal given in column III, and the tints of the dyeings obtained with these dyestuffs on wool are given in column IV:

| | I | II | III | IV |
|---|---|---|---|---|
| 1 | 2-amino-4-sulfamoylphenol | 3-(4-chlorophenyl)-5-hydroxy-pyrazole (NH) | Co / Cr | brown-yellow. / red-orange. |
| 2 | 2-amino-4-sulfamoylphenol | 3-(4-chlorophenyl)-5-hydroxy-1-methyl-pyrazole | Cr / Co | red-orange. / brown-yellow. |
| 3 | 2-amino-4-chloro-5-sulfamoylphenol | 3-phenyl-5-hydroxy-pyrazole (NH) | Cr | red. |
| 4 | 2-amino-4-sulfamoyl-6-nitrophenol | 1-(2-chlorophenyl)-3-phenyl-5-hydroxy-pyrazole | Cr | scarlet. |
| 5 | 2-amino-4-chloro-6-sulfamoylphenol | 1-(2-chlorophenyl)-3-phenyl-5-hydroxy-pyrazole | Cr | red. |
| 6 | 2-amino-4-sulfamoylphenol | 1-(2-methoxyphenyl)-3-(4-chlorophenyl)-5-hydroxy-pyrazole | Cr / Co | red-orange. / brown-yellow. |
| 7 | 2-amino-4-sulfamoylphenol | 1-(2-chlorophenyl)-3-phenyl-5-hydroxy-pyrazole | Cr / Co | red-orange. / brown-yellow. |
| 8 | 2-amino-4-sulfamoylphenol | 1-(4-chlorophenyl)-3-phenyl-5-hydroxy-pyrazole | Cr / Co | red-orange. / brown-yellow. |

| | I | II | III | IV |
|---|---|---|---|---|
| 9 | 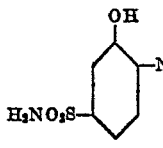 | 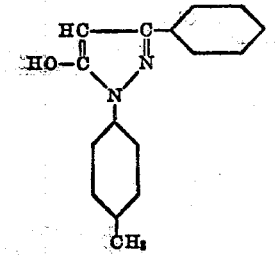 | Cr | red. |
| 10 | 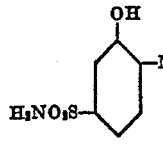 | 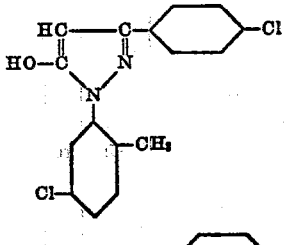 | Cr | yellowish red. |
| 11 | 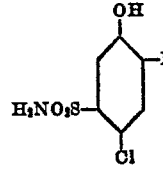 | 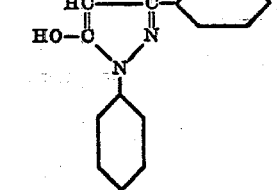 | Cr | red. |
| 12 | 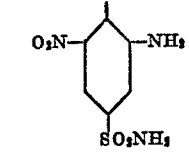 | 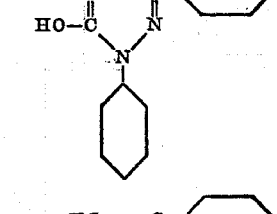 | Cr | yellowish red. |
| 13 | 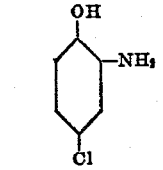 | 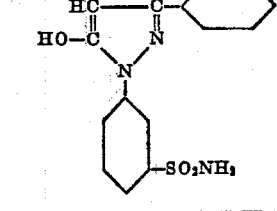 | { Cr<br>  Co | red.<br>brown yellow. |

Example 2

4.63 parts of the sodium salt of the dyestuff from diazotized 2-amino-1-hydroxybenzene-4-sulfonic acid methylamide and 2-hydroxynaphthalene, and 5.02 parts of the sodium salt of the dyestuff from diazotized 5-nitro-2-amino-1-hydroxybenzene and 1-(3′-sulfonamidophenyl)-3-phenyl-5-pyrazolone, are stirred in 200 parts of water and, after the addition of 2.66 parts of a sodium hydroxide solution of 30 percent strength and 24 parts of a solution of sodium chromosalicylate having a chromium content of 2.6 percent, the whole is heated for 3 hours under reflux. At the end of this period the chroming is complete. The dyestuff is precipitated by neutralization with acetic acid, filtered off and dried. It is a black water-soluble powder which dyes wool from neutral or acetic acid baths fast greyish violet tints.

Example 3

100 parts of well wetted wool are entered at 40–50° C. into a dyebath which contains in 4000 parts of water 1 part of the chromiferous dyestuff obtained as described in the first and second paragraphs of Example 1. 2 parts of acetic acid of 40 percent strength are added, the bath is raised to the boil in the course of ½ hour and dyeing is carried on at the boil for ¾ hour. Finally the wool is rinsed with cold water and dried. There is obtained a full red-orange dyeing of very good fastness to washing and light.

The same result is obtained when no acetic acid is added to the dyebath.

Example 4

100 parts of superpolyamide fibers (nylon fibers) are entered at 40–50° C. into a dyebath which contains in 4000 parts of water 1 part of the chromiferous dyestuff obtained as described in the first and second paragraphs of Example 1. 3 parts of acetic acid of 40 percent strength are added, and the dyebath is raised to the boil in the course of ½ hour and dyeing is carried on at the boil for ¾ hour. Finally the goods are rinsed with cold water and dried. There is obtained a full orange-red dyeing of very good fastness to light and washing.

What is claimed is:

1. A member of the group consisting of an ortho:ortho'-dihydroxy monoazo dyestuff which contains an aromatically bound —SO₂NH₂— group, is free from sulfonic acid and carboxylic acid groups and corresponds to the formula

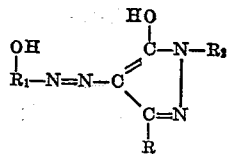

in which R₁ represents a benzene radical bound to the azo-linkage in ortho-position relatively to the hydroxyl group, R₂ represents a member of the group consisting of a hydrogen atom, a lower alkyl and a benzene radical, R₃ represents a benzene radical, at least one of the benzene radicals in the molecule containing a substituent selected from the group consisting of methyl, nitro, methoxy and chlorine, and a complex metal compound thereof which contains substantially two dyestuff molecules bound in complex union with one atom of a metal selected from the group consisting of chromium and cobalt.

2. A complex chromium compound containing one atom of chromium bound in complex union with substantially two monoazo dyestuff molecules free from sulfonic acid and carboxylic acid groups corresponding to the formula

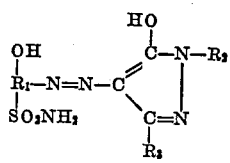

wherein R₁, R₂ and R₃ each represent a benzene radical, at least one of which contains a member of the group consisting of a methyl group, a nitro group, a methoxy group and a chlorine atom and R₁ is bound to the azo linkage in ortho position relatively to the hydroxy group.

3. A complex cobalt compound containing one atom of cobalt bound in complex union with substantially two monoazo dyestuff molecules free from sulfonic acid and carboxylic acid groups corresponding to the formula

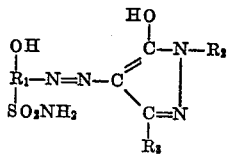

wherein R₁, R₂ and R₃ each represent a benzene radical, at least one of which contains a member of the group consisting of a methyl group, a nitro group, a methoxy group and a chlorine atom and R₁ is bound to the azo linkage in ortho position relatively to the hydroxy group.

4. A complex chromium compound containing one atom of chromium bound in complex union with substantially two monoazo dyestuff molecules free from sulfonic acid and carboxylic acid groups corresponding to the formula

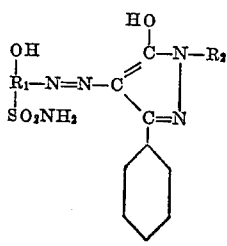

wherein R₁ represents a benzene radical bound to the azo linkage in ortho position relatively to the hydroxy group and R₂ represents a chlorobenzene radical.

5. A complex cobalt compound containing one atom of cobalt bound in complex union with substantially two monoazo dyestuff molecules free from sulfonic acid and carboxylic acid groups corresponding to the formula

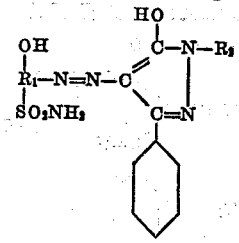

wherein R₁ represents a benzene radical bound to the azo linkage in ortha position relatively to the hydroxy group and R₂ represents a chlorobenzene radical.

6. A complex chromium compound containing one atom of chromium bound in complex union with substantially two monoazo dyestuff molecules free from sulfonic acid and carboxylic acid groups corresponding to the formula

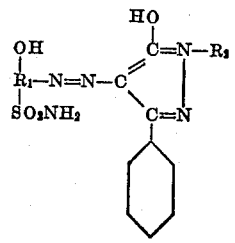

wherein R₁ represents a nitrobenzene radical bound to the azo linkage in ortho position relatively to the hydroxy group and R₂ represents a benzene radical.

7. The complex chromium compound which contains one atom of chromium bound in complex union with substantially two molecules of the monoazo dyestuff of the formula

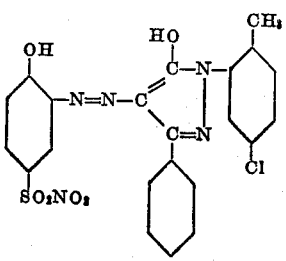

8. The complex chromium compound which contains one atom of chromium bound in complex union with substantially two molecules of the monoazo dyestuff of the formula

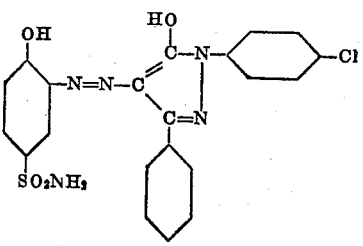

9. The complex chromium compound which contains one atom of chromium bound in complex union with substantially two molecules of the monoazo dyestuff of the formula

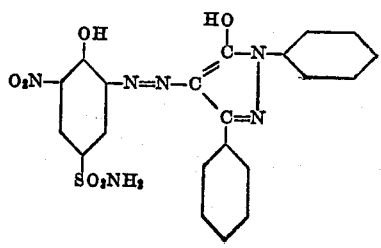

10. The complex cobalt compound containing one atom of cobalt in complex union with substantially two molecules of the monoazo dyestuff of the formula

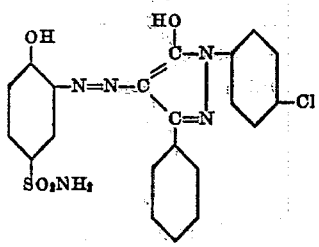

11. The complex cobalt compound containing one atom of cobalt in complex union with substantially two molecules of the monoazo dyestuff of the formula

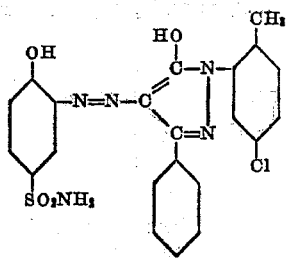

References Cited in the file of this patent
UNITED STATES PATENTS

| | | |
|---|---|---|
| 1,623,005 | Gubler et al. | Mar. 29, 1927 |
| 2,040,368 | Fischer | May 12, 1936 |
| 2,570,052 | Felix et al. | Oct. 2, 1951 |